(12) United States Patent
O'Connor

(10) Patent No.: US 12,174,206 B2
(45) Date of Patent: Dec. 24, 2024

(54) AUTOMATED SLIDE PROCESSING SYSTEMS, CONSUMABLE SLIDE PROCESSING MODULES, AND REAGENT CARTRIDGES

(71) Applicant: Ventana Medical Systems, Inc., Tucson, AZ (US)

(72) Inventor: Daniel O'Connor, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 819 days.

(21) Appl. No.: 17/151,065

(22) Filed: Jan. 15, 2021

(65) Prior Publication Data

US 2021/0172969 A1 Jun. 10, 2021

Related U.S. Application Data

(63) Continuation of application No. PCT/EP2019/068814, filed on Jul. 12, 2019.
(Continued)

(51) Int. Cl.
*G01N 35/00* (2006.01)
*G01N 1/31* (2006.01)

(52) U.S. Cl.
CPC ....... *G01N 35/00029* (2013.01); *G01N 1/312* (2013.01); *G01N 35/00732* (2013.01);
(Continued)

(58) Field of Classification Search
CPC .......... G01N 2035/00039; G01N 2035/00138; G01N 35/00732; G01N 1/312; G01N 35/00029; G01N 35/028; G01N 35/021; G01N 35/025; G01N 35/026; G01N 1/31; G01N 35/0092; G01N 35/00584; G01N 2035/00089

See application file for complete search history.

(56) References Cited

U.S. PATENT DOCUMENTS 6,849,457 B1 2/2005 Babson
2002/0192701 A1 12/2002 Adey
(Continued)

FOREIGN PATENT DOCUMENTS

WO 2005016532 2/2005
WO 2017081115 5/2017
(Continued)

OTHER PUBLICATIONS

International Search Report and Written Opinion, mailed Feb. 11, 2020, in corresponding PCT/EP2019/068814, filed Jul. 12, 2019, pp. 1-23.
(Continued)

*Primary Examiner* — Matthew D Krcha
*Assistant Examiner* — Tingchen Shi
(74) *Attorney, Agent, or Firm* — Perkins Coie LLP

(57) ABSTRACT

Systems and methods that enable automated processing of specimens carried on microscope slides are described herein. Aspects of the technology are directed, for example, to an automated staining system including a dispensing instrument that receives a processing module to deliver reagent to a reaction chamber of the slide processing module. The processing module can carry fresh reagents, waste material, and the side.

15 Claims, 8 Drawing Sheets

Related U.S. Application Data

(60) Provisional application No. 62/698,820, filed on Jul. 16, 2018.

(52) U.S. Cl.
CPC .............. *G01N 35/0099* (2013.01); *G01N 2035/00039* (2013.01); *G01N 2035/00138* (2013.01)

(56) References Cited

U.S. PATENT DOCUMENTS

| | | | |
|---|---|---|---|
| 2012/0177543 A1* | 7/2012 | Battrell | F04B 43/043 422/187 |
| 2015/0298118 A1 | 10/2015 | Chard et al. | |
| 2015/0343445 A1* | 12/2015 | Bagnato | B01L 3/52 422/547 |
| 2017/0058245 A1* | 3/2017 | Shah | B01L 3/50273 |
| 2017/0328820 A1 | 11/2017 | Angros | |
| 2018/0073963 A1 | 3/2018 | Kawano et al. | |
| 2018/0193831 A1 | 7/2018 | Hopper | |
| 2021/0172967 A1 | 6/2021 | Stefano et al. | |
| 2021/0172968 A1 | 6/2021 | Gaertner et al. | |

FOREIGN PATENT DOCUMENTS

| | | |
|---|---|---|
| WO | 2017081115 A1 | 5/2017 |
| WO | 2018001767 | 1/2018 |
| WO | 2020016113 | 1/2020 |
| WO | 2020016126 | 1/2020 |
| WO | 2020016127 | 1/2020 |

OTHER PUBLICATIONS

ISA: European Patent Office, PCT/EP2019/068774, filed Jul. 13, 2019, International Search Report and Written Opinion mailed: Nov. 20, 2019, 18 pages.

ISA: European Patent Office, PCT Application No. PCT/EP2019/68809, filed Jul. 12, 2019, International Search Report and Written Opinion: mailed: Mar. 19, 2020, 14 pages.

* cited by examiner

AUTOMATED SLIDE PROCESSING SYSTEMS, CONSUMABLE SLIDE PROCESSING MODULES, AND REAGENT CARTRIDGES

CROSS-REFERENCE TO RELATED APPLICATIONS

This application is a continuation of PCT Application No. PCT/EP2019/068814, filed Jul. 12, 2019, which claims priority to U.S. Provisional Application No. 62/698,820, filed Jul. 16, 2018, which are hereby incorporated by reference in their entireties.

TECHNICAL FIELD

This disclosure relates to systems for preparing samples for analysis. In particular, the disclosure relates to automated slide processing systems, consumable slide processing modules, and related technologies for processing samples.

BACKGROUND

A wide variety of techniques have been developed to prepare and analyze biological specimens. Example techniques include microscopy, microarray analyses (e.g., protein and nucleic acid microarray analyses), and mass spectrometric methods. Specimens are typically prepared for analysis by applying one or more liquids (e.g., reagents) to the specimens. If a specimen is treated with multiple liquids, both the application and subsequent removal of each liquid can be important for producing stained specimens suitable for analysis. For example, microscope slides bearing biological specimens, e.g., tissue sections or cells, are often treated with a series of manually applied reagents to add color and contrast to otherwise transparent or invisible cells or cell components. This labor-intensive process often results in inconsistent processing due to individual techniques among laboratory technicians.

Automated slide processing machines are often used for high-volume slide processing. Unfortunately, conventional automated slide processing machines are typically relatively large, thus making them unsuitable for use in surgery suites and small laboratories. For example, conventional automated pipetting systems can be quite large and have pipetting heads capable of individually dispensing liquids onto specimen-bearing microscope slides held by a tray. Pipettes are used to aspirate reagents out of bottles and to dispense the reagents onto uncovered slides. The reagents are exposed to air which can lead to degradation, e.g., due to oxidation, or biologic contamination of solution components over time. This can lead to inconsistent staining unless the solutions are regularly replenished or exchanged. Replenishing or exchanging liquids can be a time-consuming and wasteful process that often disrupts work-flow. Additionally, automated pipetting systems have a limited number of reagent bottles, thus limiting the number of staining protocols that can be performed or necessitating swapping which negatively impacts workflow. Accordingly, conventional automated slide processing machines suffer various drawbacks.

SUMMARY

At least some embodiments include a staining system for preparing and analyzing biological specimens. The staining system can include a consumable stainer unit for processing microscope slides bearing biological specimens with a series of robotically applied reagents to add color stains and background contrast to otherwise transparent or invisible cells or cell components. The stainer unit can be used with an instrument in a laboratory environment. The instrument can cause reagent to be delivered from reagent-filled capsules to a cell to process a specimen. The cell can be a flow or reaction cell that prevents, limits, or minimizes reagent boiling, evaporative losses, stain degradation (e.g., due to oxidation), and minimizes or eliminates the possibility of tissue cross-contamination, or other problems. Accordingly, the stainer unit can be used to control reagent characteristics (e.g., concentrations, mixtures, etc.) to enhance the effectiveness of the reagents, resulting in desired staining characteristics. In single-use embodiments, the reagent cartridge can hold enough reagent to perform a single multistep staining protocol to avoid reagent waste and can be made of relative low-cost materials. To process multiple slides, each slide can be processed with a consumable stainer unit selected from a family of consumables based on the reagents stored within them, and the staining protocol required. Manual procedures, automated procedures, or combinations of manual and automated procedures can be used to process the slides.

In some embodiments, a stainer unit includes reagents and a reaction cell configured to at least partially define a reaction chamber. The stainer unit can include a fluid circuit that allows the reagents to be delivered to the reaction chamber. The fluid circuit can seal the reaction cell to inhibit or prevent evaporation and/or boiling of one or more of the reagents in the reaction chamber during, for example, high-temperature processing. The fluid circuit can include one or more valves in fluid communication with the reaction chamber. The valves can be located along passageways in fluid communication with the reaction chamber. In some embodiments, the fluid circuit allows the regents to be sequentially delivered to the reaction chamber and inhibits or prevents fluid flow away from reaction chamber. The sealed reaction cell can increase a boiling point of the reagent to accelerate high-temperature target retrieval (e.g., antigen retrieval). The reaction chamber can be located along a specimen-bearing surface of a microscope slide or at another suitable location, and the reaction cell can be a flow cell through which reagents can flow and be held in contact with the specimen.

In some embodiments, an automated slide staining system includes a high-temperature slide processing module. The slide processing module can include regents, a reaction cell configured to at least partially define a reaction chamber along a specimen-bearing surface of a microscope slide that is carried by the high-temperature slide processing module, and one or more valves. The valves allow the reagents to be delivered to the reaction chamber. The valves are configured to seal the reaction cell to inhibit boiling of one or more of the reagents in the reaction chamber. When the reaction cell is sealed, the reaction chamber can be pressurized to raise a boiling point of one of the reagents in the reaction chamber for high temperature antigen retrieval. In some embodiments, regents can be sequentially delivered to the reaction chamber and can inhibit fluid from flowing out of the reaction chamber, thereby increasing the reagent's boiling point. The valves can include a first valve in communication with an inlet port of the flow cell and a second valve in communication with an outlet port of the flow cell and a waste container.

In further embodiments, a microfluidic slide processing module for processing slides includes a support base and a flow cell connected to the support base. The flow cell can include a slide engagement region having a surface and a sealing member. The sealing member is configured to sealingly contact a specimen-bearing surface of a microscope slide to define a flow cell between the surface of the slide engagement region and the specimen-bearing surface. In some embodiments, the flow cell can be sealed by one or more valves (e.g., valves positioned along entry and exit ports, fluid lines, or passageways), and the sealing arrangement provided via the reaction chamber seals. Reagents can be held in the reaction chamber to maintain hydration of the specimen and provide a suitable target with associated marker, e.g., an antibody, DNA probe, dye molecule, or the like. The microfluidic slide processing module, including the sealed reaction chamber, can then be heated to temperatures higher than the boiling temperature of the reagent (e.g., a primarily water based reagent) to provide enhanced antigen retrieval. The flow cell area can be provided with suitable physical support on upper and lower surfaces to ensure seals are maintained even when high pressure is experienced. Such high pressures can inhibit or prevent boiling when the reagent is at temperatures equal to or higher than 80° C., 90° C., 100° C., 105° C., 110° C., 115° C., or 120° C. such that enhanced staining (e.g., accelerated processing) can be achieved in very short periods of time. Fresh reagent can be pumped through an open inlet valve and into the reaction chamber while used reagent is pushed through an open outlet valve. The inlet and outlet valves can be closed again to perform additional high temperature steps.

In yet further embodiments, an automated staining system can include a slide processing module and a dispensing instrument. The slide processing module can include a flow cell configured to sealingly contact a specimen-bearing surface of a microscope slide to provide a reaction chamber along the specimen-bearing surface, a capsule receiver fluidly coupled to the flow cell and including a chamber, and a reagent cartridge that holds a plurality of capsules each containing reagent. The reagent cartridge sequentially feeds the capsules to the capsule receiver. The dispensing instrument can operate to cause a respective one of the capsules (or multiple capsules to mix reagents) that has been delivered to the chamber to release reagent such that the released reagent is delivered to the reaction chamber.

The dispensing instrument can include a reciprocating drive mechanism operable to move the actuator in a first direction to cause the respective one of the capsules located with the chamber to release reagent and a second direction to allow another one of the capsules to be delivered into the chamber. The actuator can be fixedly coupled to or part of the dispensing instrument. In some embodiments, the dispensing instrument can include a drive mechanism having a dispensing mode for moving the actuator toward the respective one of the capsules in the chamber and a reloading mode for allowing another one of the capsules filled with reagent to be delivered into the chamber. Two capsules can be burst to produce reagent mixtures.

A method for processing a specimen includes robotically releasing a series of reagents from a plurality of capsules such that the reagents flow into a reaction chamber of a flow cell such that the reagents sequentially contact a specimen held on a microscope slide cartridge and in the reaction chamber. The reaction chamber can be at least partially defined by a mounting surface of a microscope slide and a microscope slide cartridge. The method can include causing reagent in the reaction chamber to flow into at least one waste container of the microscope slide cartridge. A first reagent can be delivered from a first one of the capsules to the reaction chamber, and a wash liquid can be delivered to the reaction chamber to flush the first regent from the reaction chamber. After flushing the reaction chamber, additional reagents from the other capsules can be delivered, whether sequentially or concurrently, to the reaction chamber. In some flushing procedures, the wash liquid can remove most of a reagent by volume from the reaction chamber. In some dispensing procedures, a plunger is repeated reciprocated between a standby position and a dispense position to cause reagent to be released each of the reagent capsules.

In further embodiments, a method includes performing a plurality of specimen processing operations on a specimen held in a flow cell at least partially defined by a mounting surface of a slide carrying the specimen. The processing can include sequentially delivering reagents to a reaction chamber of the flow cell. The used reagent can be delivered into a waste container fluidly coupled to the flow cell. The microscope slide cartridge can carry the microscope slide while the microscope slide cartridge is removed from and/or delivered to an automated instrument. Each reagent can be delivered through a fluid circuit of the microscope slide cartridge to deliver reagent into the reaction chamber and to deliver waste reagent to waste container.

In further embodiments, a method includes processing a plurality of specimens within the same cartridge. The processing can include applying the same reagents to multiple specimens either simultaneously or sequentially.

DETAILED DESCRIPTION

The following description of several embodiments describes non-limiting examples of the disclosed system and methods to illustrate the technology. Furthermore, all titles and headings provided herein are for convenience only and are not intended to limit or interpret the scope or meaning of the invention. Specific details of several embodiments of the present technology are disclosed herein with reference to FIGS. 1-11. It should be noted that other embodiments in addition to those disclosed herein are within the scope of the present technology. For example, embodiments of the present technology can have different configurations, components, substances, and/or procedures than those shown or described herein. Moreover, a person of ordinary skill in the art will understand that embodiments of the present technology can have configurations, components, substances, and/or procedures in addition to those shown or described herein and that these and other embodiments can be without several of the configurations, components, and/or procedures shown or described herein without deviating from the present technology.

I. Overview of Automated Processing Systems

Figure 1:
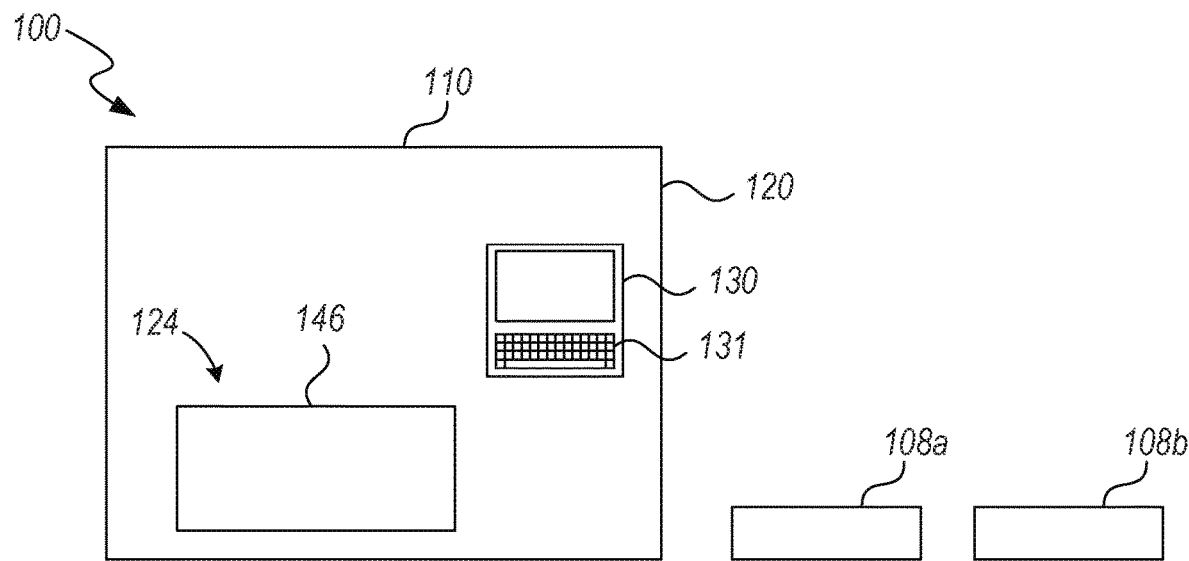
FIG. 1 is a front view of an automated specimen processing system in accordance with an embodiment of the disclosed technology.

FIG. 1 is a front view of an automated specimen processing system 100 ("system 100") in accordance with an embodiment of the disclosed technology. The system 100 can include a robotic staining instrument 110 and consumable stainer units 108a, 108b. The staining instrument 110 can include a protective housing 120, a loading zone or loading station 124 ("station 124"), and a controller 130. The station 124 can include a door or access port 146 for loading and unloading stainer units 108a, 108b, illustrated schematically, carrying specimen-bearing microscope slides. Each stainer unit 108a, 108b can contain reagents and a waste container. The staining instrument 110 can use reagents on-board the stainer units 108 to process the specimens. After processing, the stainer units 108a, 108b can be retrieved from the instrument 110, the specimen-bearing slides can be removed from the stainer units 108a, 108b, and the specimens can be analyzed. The system can be provided with storage capability, for example a stainer unit holding rack from which the system can access stainer units to be processed, and capable of re-inserting stainer units at various stages of assay completion.

Each stainer unit 108a, 108b (collectively "stainer units 108") can contain most or all of the substances for performing the assay, for example, specimen conditioning (e.g., cell conditioning, washing, etc.), antigen/target retrieval, staining (e.g., hematoxylin and eosin staining), or other types of protocols (e.g., immunohistochemistry protocols, in situ hybridization protocols, etc.) for preparing specimens for visual inspection, fluorescent visualization, microscopy, microanalyses, mass spectrometric methods, imaging (e.g., digital imaging), or other analytical or imaging methods. The fluids can be held in airtight capsules, sealed reservoirs, containers, or other suitable holders to minimize or limit the possibility of reagent oxidation that could impact staining even when the stainer unit is stored for relatively long periods of time (e.g., months or years). The single doses also limit thermal exposure to other stored reagents when taken out of temperature controlled environments (e.g., when removed from a refrigerator). The stainer units 108 can include one or more cells (e.g., flow cells, reaction cells, etc.), reaction chambers, fluid lines, channels, valves (e.g., check valves, membrane valves, globe valves, etc.), ports, pressurization devices (e.g., pumps, syringes, etc.), or other components for fluidly communicating with reaction chambers. The stainer units 108 can also include one or more mixing components (e.g., mixing wells, reagent trays, etc.) for mixing reagents in, for example, lyophilized and/or liquid form. The configurations of the stainer units and onboard substances can be selected based upon the staining protocols to be performed and functionality of the staining instrument 110.

Multiple stainer units can be available to perform different protocols. For example, the stainer unit 108a can have reagents for performing hematoxylin and eosin (H&E) staining and the stainer unit 108b can have reagents for performing advanced staining protocols, such as immunohistochemistry protocols or in situ hybridization protocols. In some single-use embodiments, each stainer unit 108 can carry a sufficient amount of reagent to perform only a single protocol using fresh reagents to avoid producing excess reagent waste. The reagent reservoirs and waste containers can be permanently sealed to prevent reuse. In some multi-use embodiments, reagent can be replenished any number of times and the reagent chamber can be flushed and washed. The stainer units 108 can contain waste materials for convenient disposal. The waste materials can include waste reagents, wash solutions, or other fluids that can be collected in a removable waste container that can be discarded separately from other components of the stainer unit 108. This allows for separate handling of unused and used liquids.

The controller 130 can be used to select protocols and can receive information. The information can be inputted by the user using an input device 131, such as a keyboard, a touchscreen, or the like. In some embodiments, the staining instrument 110 includes one or more readers in communication with the controller 130. The readers can obtain information from machine readable labels, barcodes, or other types of labels applied to, for example, the microscope slides, stainer units, or reagent reservoirs. The controller 130 can command system components based, at least in part, on the obtained information, and can generally include, without limitation, one or more processors, computers, central processing units, microprocessors, digital signal processors (DSPs), application-specific integrated circuits (ASICs), readers, or the like. In some embodiments, the controller 130 can be programmed to receive information from microscope slides, process specimens based on the received information, and acquire one or more images of processed specimens.

To store information, the controller 130 can include, without limitation, one or more storage elements, such as memory (e.g., volatile memory, non-volatile memory, read-only memory (ROM), random access memory (RAM)). For example, the memory can be non-transitory computer-readable memory that stores instructions that, when executed by a processor, cause the controller 130 to perform operations. The stored information can include, without limitation, reagent information, expiration information (e.g., reagent expiration date), stainer unit information, staining protocols, reagent recipes, heating or cooling programs, optimization programs, calibration programs, indexing programs, databases, imaging programs, and/or executable programs. The protocols can include reagent protocols (e.g., number and/or order of reagents applied), thermal protocols (e.g., heating/cooling routines), and other executable instructions for processing slides. The stored information can be used to determine, for example, protocols for processing the stainer unit based on information acquired from the stainer unit, inputted by an operator, or both, for example. In some embodiments, the instrument 110 can obtain information from the stainer unit and additional information from the microscope slide. The microscope slide information can include tissue information and staining to be performed. Based on that information, the controller 130 can determine an appropriate protocol for processing the tissue specimen based on the available resources, and if another stainer unit or reagent cartridge should be used, a notification can be provided to the user.

In operation, a user can manually load the stainer unit 108 with a specimen-bearing microscope slide. The user can visually confirm proper loading and can then feed the stainer unit 108 to the instrument 110. In other embodiments, the user separately loads microscopes slides and stainer units 108 into the staining instrument 110, which can robotically load the stainer units with the microscope slides. Reagent cartridges can be installed in the stainer units 108 before or after delivering the units to the staining instrument 110. Closed reagent reservoirs or capsules can prevent, limit, or minimize evaporative losses, stain degradation, cross-contamination between slides (typically experienced with dip and dunk systems), or other problems, thereby enabling control of reagent characteristics (e.g., concentrations, mixtures, etc.) to enhance the effectiveness of the reagents and resulting in desired staining characteristics. The sealed reagent chambers of the closed flow cell can be pressurized to inhibit or prevent boiling of the reagent or water in the specimen, thereby enabling high temperature processing without the adverse effect associated with excessive heating the reagent and/or specimen.

The staining instrument 110 can controllably dispense fresh processing liquids onto the slides without splattering onto its mechanical or electrical components, as well as adjacent slides often present in conventional pipetting systems, and can controllably remove processing liquids from the slides via vacuum or liquid replacement or other suitable means. The controlled reagent dispensing/removal reduces volumes of liquid waste (e.g., waste reagents which have passed through the reaction chamber) by, for example, minimizing or otherwise limiting volumes of utilized reagents. In some embodiments, specimen processing may include contacting specimens with a series of liquids that include, for example, one or more deparaffinizing liquids, conditioning liquids, staining reagents, stain-differentiating reagents, stain-setting reagents, washing liquids, and/or coverslipping liquids.

The stainer units 108 can contain the reagents throughout processing, so the staining instrument 110 can process specimens without contacting the reagents. For example, the stainer units 108 can hold aliquots of reagent and can cause reagents to flow into a reaction chamber and into contact with a specimen. In some procedures, most of the reagent from multiple capsules or reservoirs is delivered to the flow cell to process the specimen. Most of the reagent, by volume, can be contained in the stainer units 108 is carried in a waste container upon completion of the specimen processing operations. For example, the waste container can contain most of the reagent, by weight or volume, carried by the used stainer unit 108. In some procedures, the waste container contains at least 30%, 40%, 50%, 60%, 70%, 80%, 90%, and 95% of the total volume of reagent carried by the stainer unit 108. The used stainer unit 108, which still carries the unused reagents and waste reagent, can be removed from the instrument 110 for subsequent disposal.

Closed reagent chambers can prevent, limit, or minimize boiling of reagents, boiling of tissue, evaporative losses, stain degradation, cross-contamination between slides (typically experienced with dip and dunk systems), or other problems, thereby enabling control of reagent characteristics (e.g., concentrations, mixtures, etc.) to enhance the effectiveness of the reagents and resulting in desired staining characteristics. The stainer units 108 can have integrated coverslips for viewing the specimen, thereby avoiding an additional coverslipping step. In some embodiments, the staining instrument 110 can perform a coverslipping operation. After coverslipping, the stainer unit 108, which carries the coverslipped slide, can be retrieved at the station 124. In other embodiments, the microscope slide can be coverslipped after removal from the instrument 110. Additional processing can be performed on the slide.

Figure 2:
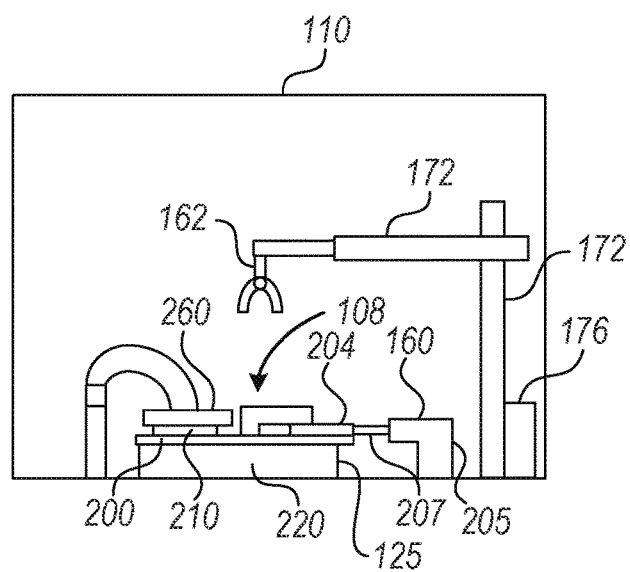
FIG. 2 is a front view of internal components of the specimen processing system of FIG. 1.

FIG. 2 is a front view of internal components of the instrument 110 in accordance with an embodiment of the disclosed technology. The instrument 110 can include a dispenser instrument 160 configured to operate a processing module 108, illustrated at a module-receiving station 125. The processing module 108 can be include a base 200, a dispensing unit 204, and a reaction or flow cell 210. The base 200 can include fluid components for delivering reagents to the flow cell 210 and can be a rigid or semi-rigid plate. The dispenser instrument 160 can operate the dispensing unit 204 to deliver, or cause to be delivered, reagents to the flow cell 210. Dispensing units are discussed in connection with FIG. 5-9.

The dispenser instrument 160 can include one or more actuators for bursting reagent-filled capsules, piercing reagent-filled capsules, operating syringes, or other components of the dispensing unit 204. For example, the dispenser instrument 160 can include a reciprocating drive mechanism 205 operable to move an actuator 207 in first direction to cause the respective a capsule located with the dispensing apparatus 204 to release reagent and a second direction to allow another one of the capsules to be delivered into the chamber, as discussed in connection with FIGS. 9-10.

The flow cell 210 can be a microfluidic cell capable of holding small volumes of liquid. This allows all or most of the reagents, by volume or weight, to be carried onboard the stainer unit 108. For example, microfluidic flow cells can hold less than, for example, about 25 µL, about 50 µL, about 100 µL, about 150 µL or about 200 µL. In some embodiments, the flow cell 210 can hold about 25 µL to about 100 µL, about 50 µL to about 120 µL, about 75 µL to about 120 µL or other desired volumes. The specimen and reagent can be heated to a temperature equal to or higher than about 60° C., about 70° C., about 80° C., about 90° C., about 100° C., about 110° C., or about 120° C. In some embodiments, the instrument 110 operates to apply heat to the specimen to provide a dwell temperature equal to or less than about 60° C., about 70° C., about 80° C., about 90° C., about 100° C., about 110° C., or about 120° C. for a period of time. The period of time can be equal to or less than about 10 minutes, about 15 minutes, or about 20 minutes. In some embodiments, the flow cell 210 generates thermal energy to heat the specimen and/or reagents and can also operate to cool the sample. Such flow cell 210 can include one or more thermal elements, such as Peltier devices. In some procedures, the reagent can be in liquid form and comprises mostly water by weight. The closed flow cell 210 is sealed to prevent boiling of the liquid reagent therein when the liquid reagent is heated to a temperature equal to about 110° C., about 115° C., or about 110° C. The volume of reagent delivered into the flow cell 210 can be increased to increase the pressure and boiling point of the reagent.

The flow cell 210 can contact the mounting surface of the slide to form a fluid-tight seal that is maintained throughout processing even when heat is applied to the specimen and the reagent, with a dwell at 100° C., 110° C., 120° C. for up to about 20 minutes. The liquid reagent, such as primarily water based reagents, can be heated to temperatures higher than their normal boiling points to provide enhanced antigen/target retrieval. The flow cell area can be isolated by one or more seals (e.g., air-tight seals, fluid-tight seals, etc.) that can be maintained even when high pressures are experienced. This ensures that the reagents do not boil when the reagent is a temperature equal to or higher than 80° C., 90° C., 100° C., 105° C., 110° C., 115° C., or 120° C. The high-temperature processing enables enhanced staining in very short times. In some embodiments, the stainer units have pressurizable flow cells for high-temperature target retrieval (e.g., antigen retrieval). To raise the boiling point of the reagent and/or specimen, one or more valves can seal the reaction chamber by inhibiting or preventing the flow of fluid out of the reaction chamber, thereby raising a boiling point of the reagent. For example, the reaction chamber can be closed and pressurizable to raise the boiling point of the reagent (e.g., a reagent with a suitable target/antibody with associated marker) at least about 5%, 10%, 20%, or 30%.

The flow cell 210 can also remain sealed during processing to limit or prevent specimen loss, air bubble formation, or other problems, such as measurable evaporative losses. Thermal energy can be delivered uniformly or non-uniformly across the slide via conduction to produce a substantially uniform temperature profile along a specimen-bearing portion of the slide surface. In some embodiments, the substantially uniform temperature profile has a temperature variation equal to or less than a selected temperature variation across the specimen-bearing surface to achieve acceptable stain variation intensity. Non-uniform temperature profiles can also be produced along the slide or specimen if desired.

In some IHC protocols, multiple rinses at temperatures in a range between about 20° C. and about 70° C. can be applied. The rinses can include, without limitation, hydrophobic substances and organic solvents. Multiple dispense and removal steps can be performed. Each step can be performed at temperatures in a range of about 20° C. to about 70° C. and can utilize predetermined amounts of multiple reagents. The reagents can be combined prior to tissue contact. During a dwell period, the reagents within the flow cell can cover the entire specimen and, in some embodiments, can be agitated to achieve suitable staining performance. The sample can then be dehydrated and a coverslipping agent can be applied to the slide. A coverslip can be applied and the coverslipping agent can be heated to a suitable curing temperature (e.g., 70° C., 80° C., 90° C., or another suitable temperature). Alternatively, the flow cell can have an integrated coverslip. The stainer unit can allow visual access to both sides of the slides for automated imaging and visual inspection of the specimen.

The instrument 110 can perform one or more washing cycles to add and subsequently wash reagents from the flow cell 210. After incubation, reagent can be washed from the flow cell 210 to remove unreacted reagent that could affect a subsequent processing step. A washing cycle can include flushing the flow cell 210 with an excess of buffer or wash solution. The unreacted reagent can be diluted with the excess volume of the buffer or wash solution and driven out of the flow cell. In some embodiments, a washing cycle can include flushing the flow cell 210 with the wash solution. The wash solution could be miscible or immiscible with the prior reagent. In some embodiments, a washing cycle can include flushing the flow cell with a gas (e.g. air). In some protocols, a washing cycle can be performed for fluid exchange after each incubation.

The instrument can include a transporter apparatus 172 and an end effector 162. The transporter apparatus 172 can include, without limitation, one or more rail assemblies, robotic handlers, X-Y-Z transport systems, conveyors, drive elements 176 (e.g., actuators, drive motors, or the like), or other automated mechanisms or components. The end effector 162 can include, without limitation, one or more grippers, clamps, valve actuators (e.g., pushers for opening and closing diaphragm valves), or other components for operating processing modules, controlling liquid delivery, or the like. The configuration and functionality of the end effector 162 can be selected based on the configuration of the processing module 108a.

The stainer unit 108 can include a closure device 260 (e.g., a clamp) that applies pressure to the microscope slide, flow cell 210, etc. For example, the closure device 260 can apply sufficient pressure to a backside of a microscope slide to maintain a seal at the front side of a downwardly facing slide. By way of another example, the closure device 260 can apply pressure to a cover overlying the front side of an upwardly facing slide. The slide can be a generally rectangular piece of a transparent material having a front side or face for receiving the specimen. The slide can have a length of about 75 mm (3 inches), a width of about 25 mm (1 inch), and a thickness of about 1 mm (0.04 inch) and, in certain embodiments, may include a label and such a label can include characters and/or other machine-readable codes such as a barcode or an RFID tag. In other embodiments, information can be etched into the microscope slide or included within the microscope slide. Other dimensions are also possible. The microscope slide can be a standard microscope slide made of glass without any label. The stainer unit 108a and/or slide can be held at a substantially horizontal orientation. The term "substantially horizontal" generally refers to an angle within about +/−5 degrees of horizontal, for example, within about +/−2 degrees of horizontal, such as within about +/−1 degree of horizontal or about +/−0.5 degree of horizontal. The horizontal orientation of the slide can help keep the specimens centered on the slide. The slide can be held at other orientations and positions. The flow cell 210 can be configured to hold other types of substrates capable of carrying specimens in the form of cytological preparations, micro-arrays, tissue arrays, or the like.

The biological specimens disclosed herein can include one or more biological samples that can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amoebas, multicellular organisms (e.g., plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

Figure 3:
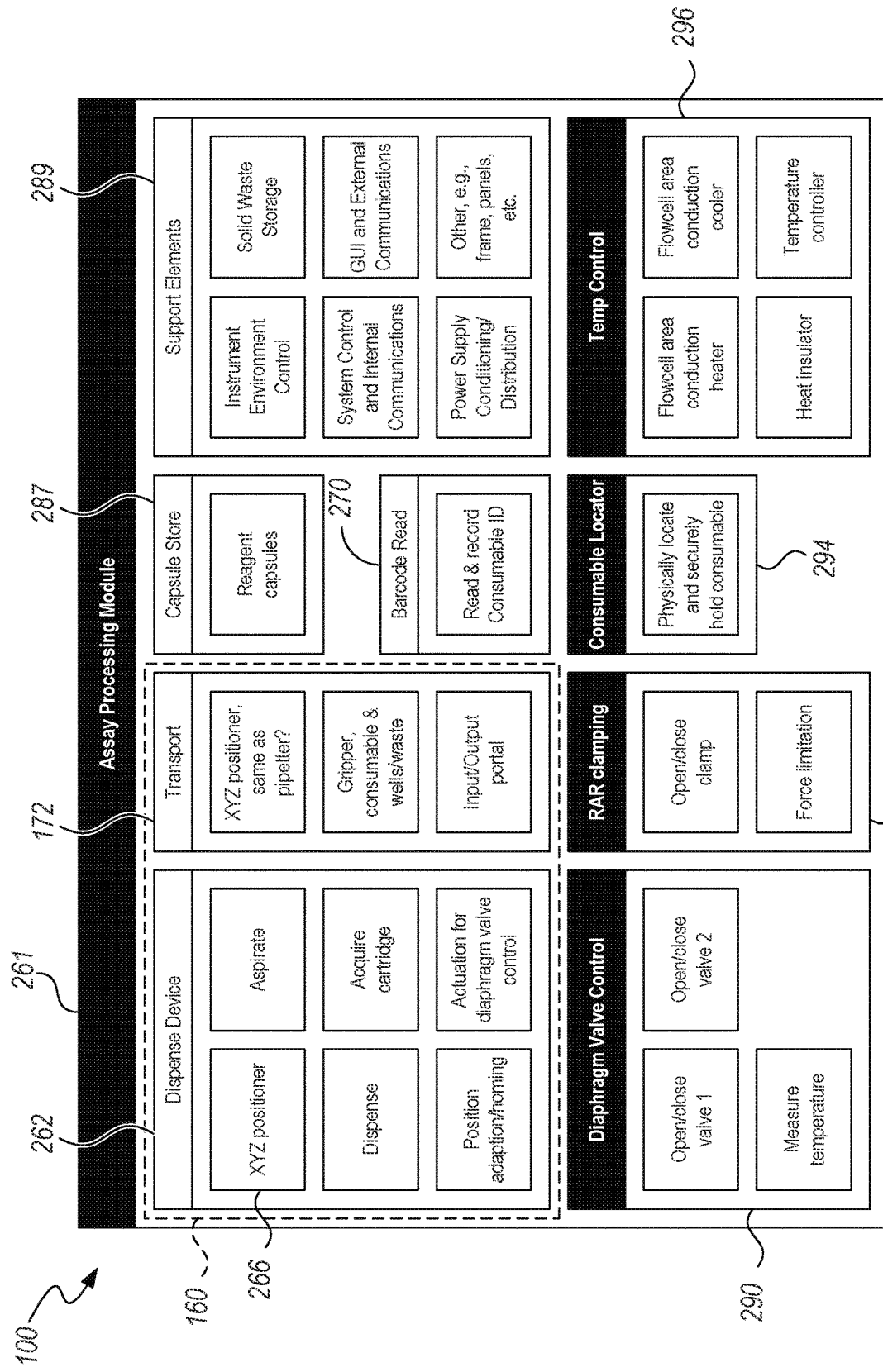
FIG. 3 is a block diagram of an automated specimen processing system with processing zones in accordance with an embodiment of the disclosed technology.

FIG. 3 is a block diagram of the system 100 in accordance with one embodiment of the disclosed technology. The system 100 can include an assay processing module 261 with a dispenser instrument 160 that includes one or more dispensing mechanisms 262 and the transporter apparatus 172. The dispensing mechanisms 262 can include one or more actuators, plungers, positioners 266 (e.g., XYZ positioners) for moving actuators, or the like.

A reader in the form of a barcode reader 270 can acquire information from stainer units, slides, cartridges, containers or other items with labels or readable information. The information (e.g., consumable ID, tissue information, etc.) can be sent to a controller (e.g., controller 130 of FIG. 1). The controller can determine a processing protocol based on the received information. Multiple readers can be used to increase throughput. The number, positions, and configurations of the readers can be selected based on target throughput, reading capabilities, or other operating parameters.

The assay processing module 261 can include support elements 289. The support elements 289 can include one or more processors, sensors, controllers, waste containers, and housing components (e.g., frame, panels, etc.). Controllers can control processing environments, system components and/or communication and can include one or more displays for displaying user interfaces (UIs) or information, for example. Waste containers can store solid waste, such as used pipettor tips. The support elements 289 can include communication components (e.g., antennae, transmitters, ports, wireless modules, etc.), power supply conditioning/distribution components, or the like. The components and configuration of the support elements 289 can be selected based on, for example, whether the system 100 communicates with another system or network.

The assay processing module 261 can also include one or more valve control modules 290, clamping modules 292, consumable locator modules 294, and/or temperature control modules 296. The valve control modules 290 can include one or more sensors (e.g., pressure sensors, temperature sensors, etc.), valves (e.g., one-way valves, diaphragm or membrane valves, etc.), actuators (e.g., pushers for opening/closing diaphragm or membrane valves), and fluid lines, for example. The clamping module 292 can clamp onto the stainer unit. For example, the clamping module 292 can include a closure device (e.g., closure device 260 of FIG. 2) configured to apply pressure to a cell (e.g., a reaction cell, a flow cell, etc.), slide, or the like. The consumable locator module 294 can physically locate and securely hold consumables. The temperature control module 296 can be part of a base (e.g., base 220 of FIG. 2) and can include one or more thermal elements, insulators, controllers, or the like. Thermal elements can be conduction heaters/coolers, resistive heaters, and/or Peltier devices and can be capable of localized heating/cooling at the flow cell area, so the flow cell and its contents can be heated/cooled without substantially affecting the temperature of the stored reagents.

Figure 4:
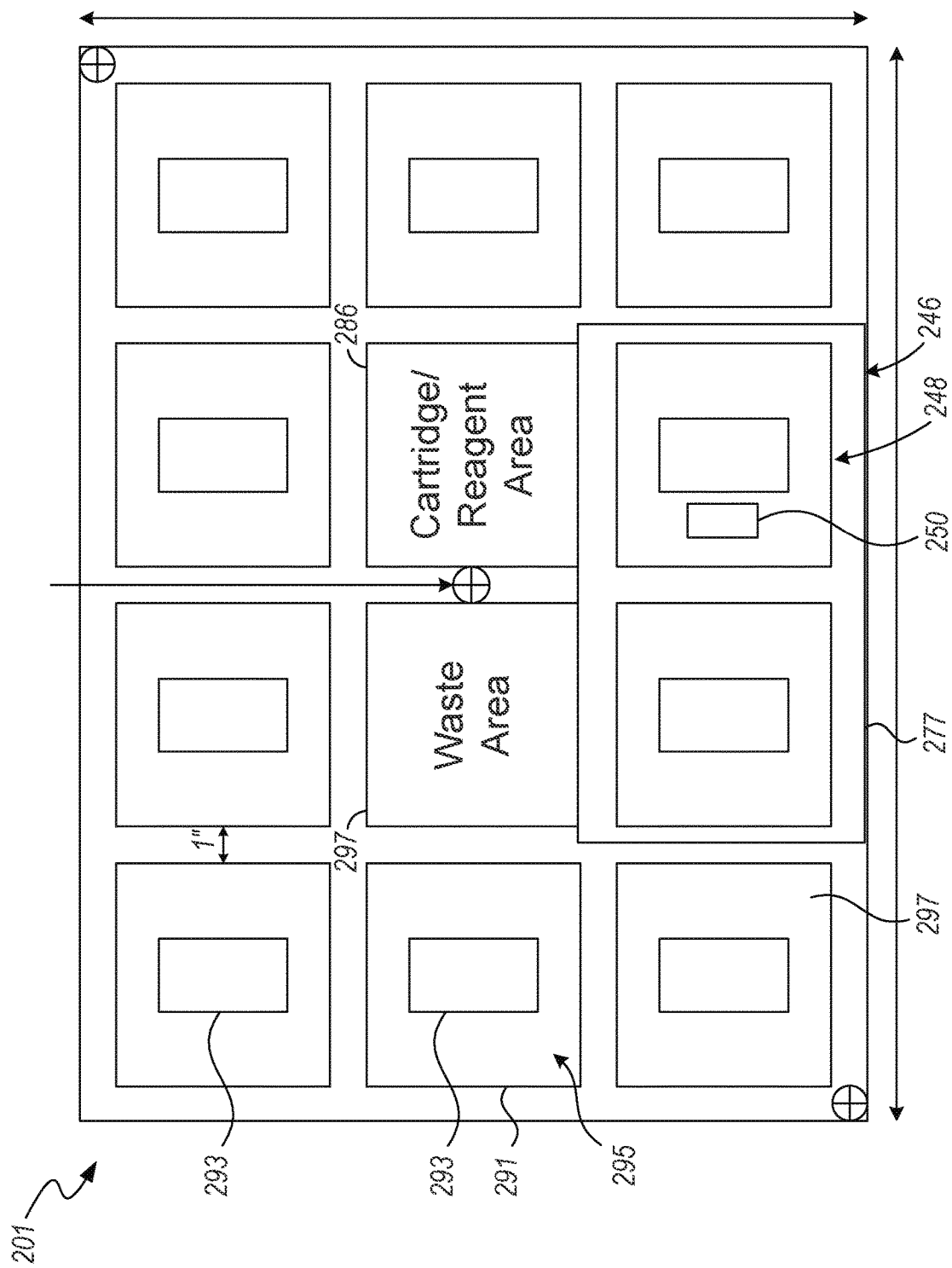
FIG. 4 is a plan view of an automated specimen processing system in accordance with an embodiment of the disclosed technology.

FIG. 4 is a top view of an automated slide processing system 201 configured for parallel processing of stainer units in accordance with an embodiment of the disclosed technology. The system 201 can include an array of processing zones or stations 291 (one identified), each capable of holding at least one stainer unit. Although the illustrated embodiment has eight stations 291, system 201 can have any number of stations. Each processing station 291 can include a station 293 (two separate ones identified) configured to receive modules/cartridges, stainer units, or the like. Processing areas 295 surround respective stations 293. The number of processing stations 291 can be selected based on the desired processing throughput. A waste reservoir or area 297 can include a container for collecting solid waste, liquid waste, or both. A supply station 286 can include a storage area (e.g., reagent cartridge rack area, a capsule storage area, etc.), coverslips, fluid containers, or the like.

In operation, stainer units can be manually or robotically loaded into the system 201 via a feed or input portal 246 ("input portal 246"). In some embodiments, an interrogation station 248 has a detector 250 positioned to analyze the slide, stainer units, or both. The detector 250 can include one or more readers, optical sensors, cameras, contact sensors, position sensors, or the like. A robotic transporter apparatus can retrieve stainer units from the station 248 and transport the retrieved stainer units to a desired zone or station. Each specimen-bearing slide can be processed based on one or more signals from the detector 250 according to, for example, one or more arbitrary user-defined sets of operations (e.g., a user-defined staining protocol), pre-defined sets of operations (e.g., preprogrammed protocol), or other processing instructions or routines. Processed stainer units can be parked at an output station 277. The number of processing zones can be selected based on the desired processing throughout, the components and functionality of each processing zone can be selected based on the processing protocols to be performed, and the configuration of the system 100 can be selected based on the desired system footprint.

Sensors can be located at various locations throughout processing systems, including on transporters, within the processing zones, and incorporated into stainer units. In some embodiments, sensors (including, without limitation, strain gauges, accelerometers, contact sensors, optical sensors, or other sensing devices capable of sensing certain events) can be used to detect contact, collisions, impacts, or other events. The sensors can output one or more signals that are received by a controller, which can determine whether a given event requires user notification or other action. For example, if an unexpected position of a cover of a stainer unit is detected, the controller can alert a user to open an access door to visually inspect the stainer unit to determine, for example, whether the slide or cover is positioned properly.

The stainer units can include an integrated coverslip that covers the specimen to enable analysis without removing the slide from the stainer unit. In other embodiments, a slide can be removed from the stainer unit for manual or robotic coverslipping. In robotic coverslipping embodiments, a coverslipper can apply solvent to slides and can then place coverslips with pre-applied adhesive onto the slides. In one embodiment, the coverslipper is substantially as described in U.S. Patent Application Publication No. 2004/0092024A1 or U.S. Pat. No. 7,468,161, which are incorporated by reference herein in their entireties. The coverslippers described in U.S. Patent Application Publication No. 2004/0092024A1 or U.S. Pat. No. 7,468,161 and their operation can be implemented to enhance coverslip handling by, for example, detecting broken coverslips, facilitating single coverslip pickup, increasing coverslipper placement precision, and/or increasing system throughput. In some embodiments, the system 100 of FIGS. 1 and 3 can have a coverslipper. Additional modules can be added to the processing systems disclosed herein to provide any number of functionalities for processing of specimens with minimal or no human intervention during normal operation.

The number of processing zones or stations can be selected based on the desired processing throughout, and the components and functionality of each processing zone or station can be selected based on the processing protocols to be performed. The automated specimen processing system 100 or 201 can have any shape, and the processing zones be arranged in any manner. Each processing zone can be configured to hold any number of stainer units, for example, 1 stainer unit, 2 or more stainer unit units, 3 or more stainer unit, or 5 or more stainer units, and the processing zones or stations can be arranged in a linear arrangement, circular arrangement, or other suitable arrangement.

II. Stainer Units/Slide Processing Modules

Figure 5:
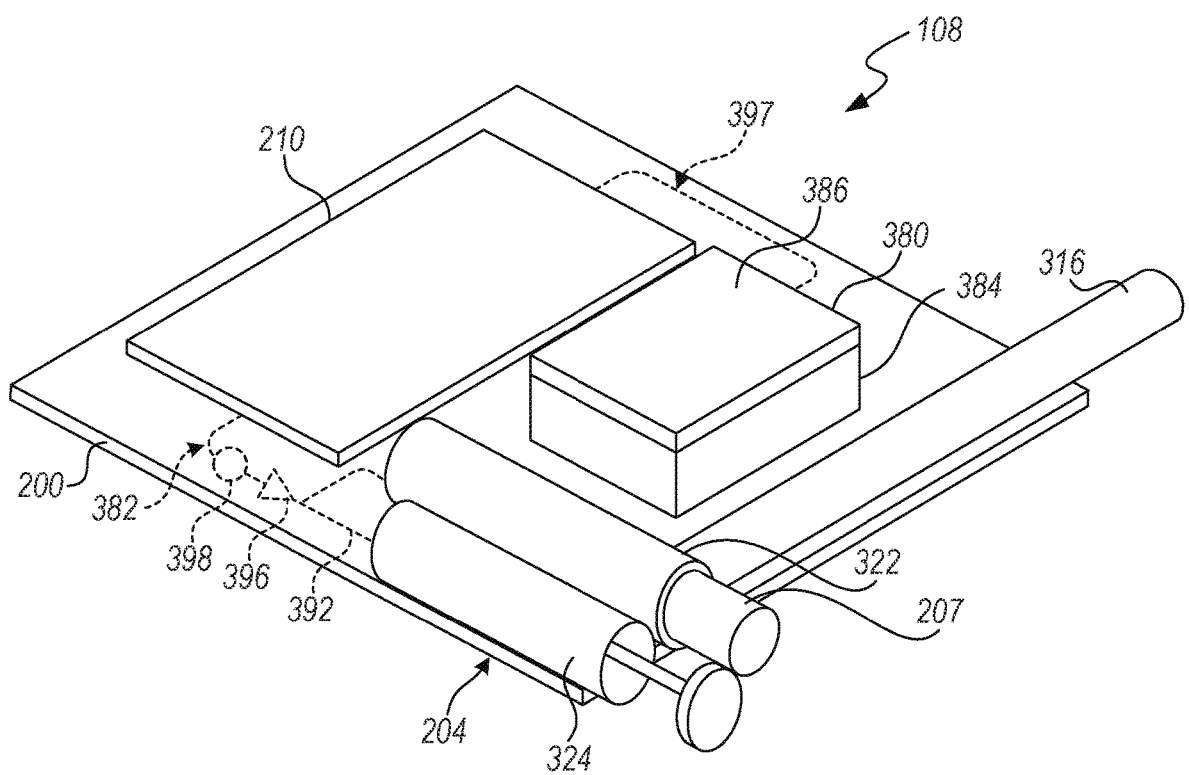
FIG. 5 is a perspective view of a slide processing module in accordance with an embodiment of the disclosed technology.

FIG. 5 is a perspective view of a stainer unit in the form of a slide processing module 108 in accordance with an embodiment of the disclosed technology. The slide processing module 108 can include a flow cell 210, a dispenser unit 204, and a reagent cartridge 316. The flow cell 210 is configured to sealingly contact a microscope slide to provide a reaction chamber along a specimen-bearing slide surface. The dispenser unit 204 can function as a reagent dispenser and can include a capsule receiver 322 and a syringe or pump 324, both fluidly coupled to the flow cell 210. The reagent cartridge 316 holds reagent-filled capsules that can be sequentially fed to the capsule receiver 322. An actuator 207 can be part of the slide processing module 108 or part of a dispenser mechanism (e.g., dispenser instrument 160) and can engage one or more capsules within the capsule receiver 322 to release reagent, which is then delivered to the flow cell 210.

The slide processing module 108 can include a base 200 and a waste reservoir or container 380. The base 200 can include a fluid circuit 382 fluidically coupling the dispenser unit 204 to the flow cell 210. The fluid circuit 382 can include one or more passageways 392, air-trap features 396, valves 398, and other fluidic elements. The base 200 can include another fluid circuit 397 that fluidly couples the flow cell 210 to the waste container 380. Fresh reagent can flow along the passageway 392, through the open valve 398, and into the flow cell 210, and waste liquid (e.g., reacted reagents) can flow along the waste passageway of the fluid circuit 397 and into the waste container 380. The waste container 380 can include a container 384 and a removable or permanent cover 386.

Figure 6:
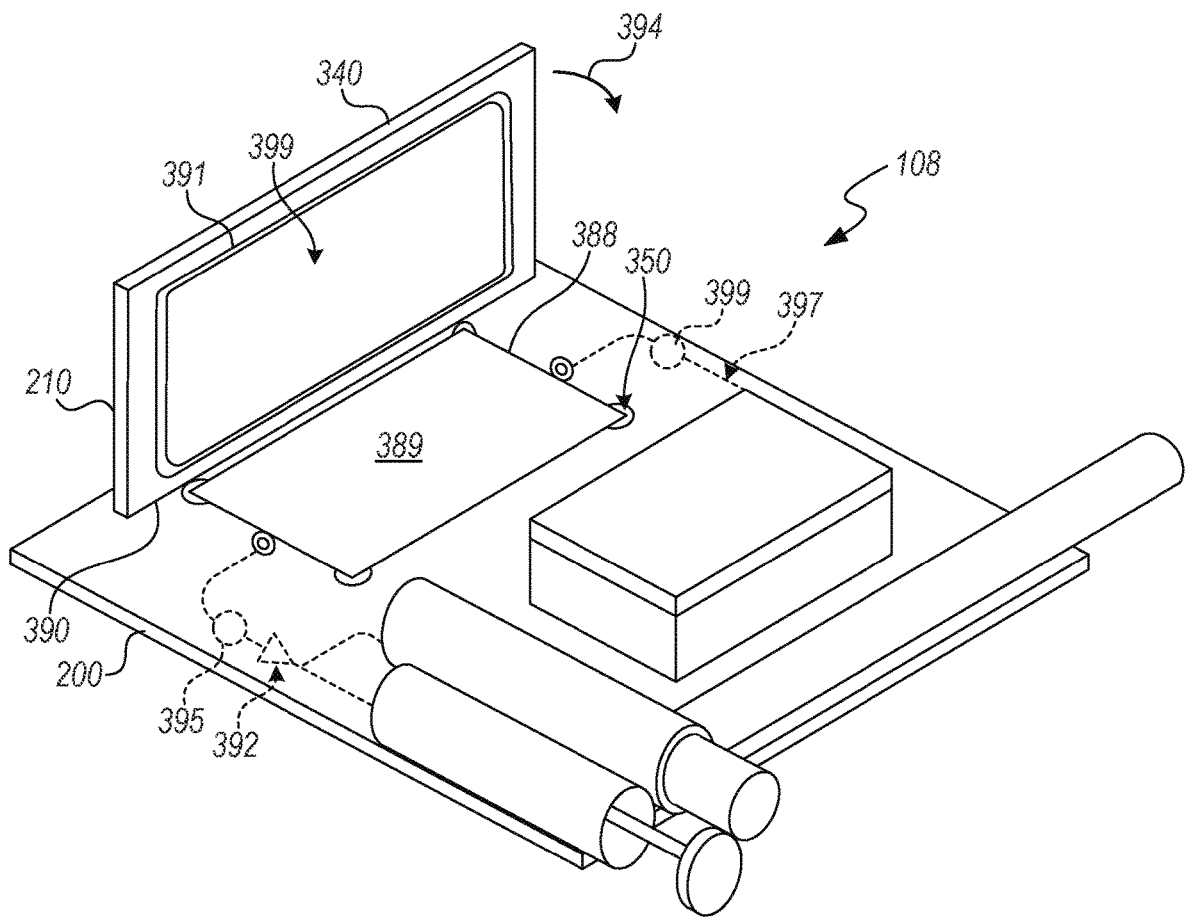
FIG. 6 is a perspective view of the slide processing module of FIG. 5 with a flow cell in an open configuration.

FIG. 6 is a perspective view of a slide processing module 108 with the flow cell 210 in an open configuration in accordance with an embodiment of the disclosed technology. A specimen-bearing microscope slide 388 is located at a set down or slide region slide-receiving 350 ("slide-receiving region 350") in the base 200. The flow cell 210 can include a cover 340 movable, as indicated by arrow 394, from an open position (FIG. 6) to a closed position (FIG. 5). In some embodiments, a hinge 390 rotatably couples the cover 340 to the base 200 and can be a living hinge, a movable joint, a flexible element, or another feature that allows movement of the cover 340. The hinge 390 can allow rotation of the cover 340 about a single axis of rotation to maintain alignment with the slide 388. In other embodiments, the cover 340 may be separable from the base 200 to allow different covers to be used with the processing module 108.

The cover 340 can include a sealing ring 391 and a tissue-receiving area 399 surrounded by the sealing ring 391. When the cover 340 is in the closed position, the sealing ring 391 can sealingly contact an upwardly facing specimen-bearing surface 389 of the microscope slide 388 or the surface of the base 200 (FIG. 8) to define a reaction chamber to prevent or limit air contact with the reagent, thereby reducing the likelihood of reagent degradation (e.g., oxidation) that would impair staining. To process a specimen on a downwardly facing specimen-bearing surface, the base 200 can have one or more sealing rings underneath the slide to define a reaction chamber under the slide.

The input fluid circuit 392 can include a fluid element 395 (illustrated in phantom line) that can be opened and closed to seal the flow cell 210 for high temperature processing, such as antigen/target retrieval. Example fluid elements 395 include membrane valves, diaphragm valves, butterfly valves, ball valves, check valves, or the like. An output fluid circuit 397 can include one or more fluid elements 399 that cooperates with the fluid element 395 to control fluid flow. The fluid circuits 392, 397 can include, without limitation, one or more pressure sensors, fluid passageways, channels (e.g., micro-channels), conduits, air-trap features, pressure regulators, or the like.

When the fluid elements 395, 399 are both closed to seal the reaction chamber, water-based reagents can be heated to temperatures higher than their normal boiling points (e.g., boiling points at atmospheric pressure) to provide enhanced target retrieval. This ensures that the reagent does not boil when it is at a temperature equal to or higher than about 100° C., about 105° C., about 110° C., about 115° C., or about 120° C. For example, the flow cell 210 can be closed and pressurized to raise the boiling point of the reagent (e.g., a reagent with a suitable target with associated marker) at least about 2%, about 5%, about 10%, about 20%, or about 30%.

Figure 7:
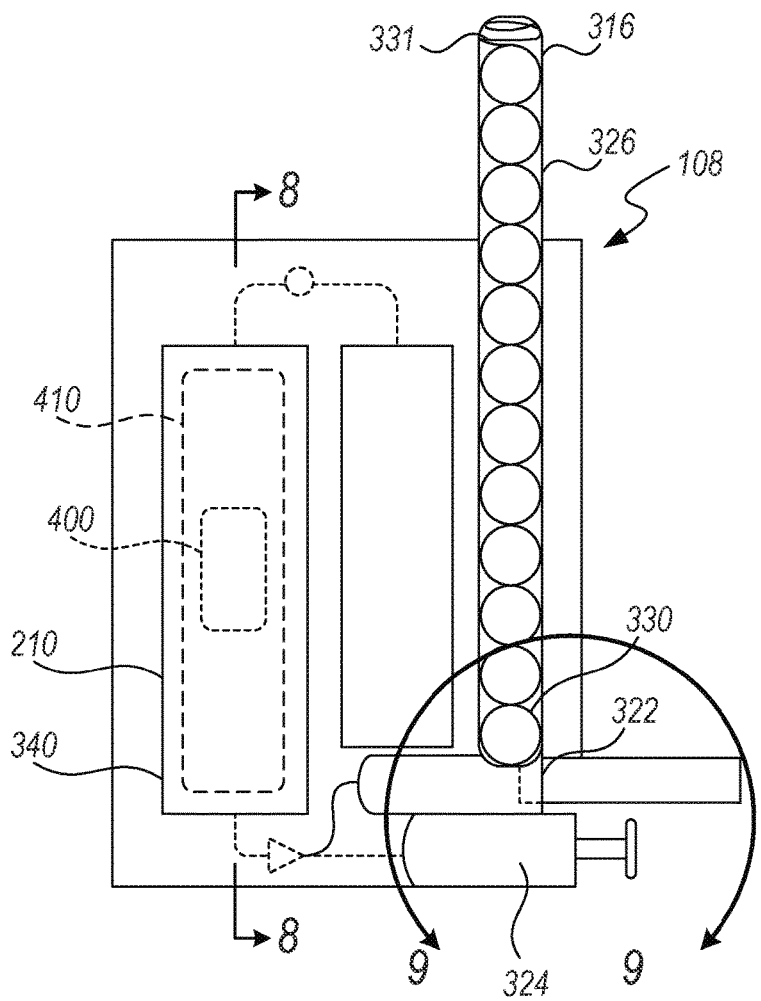
FIG. 7 is a plan view of the processing module in accordance with an embodiment of the disclosed technology.
Figure 8:
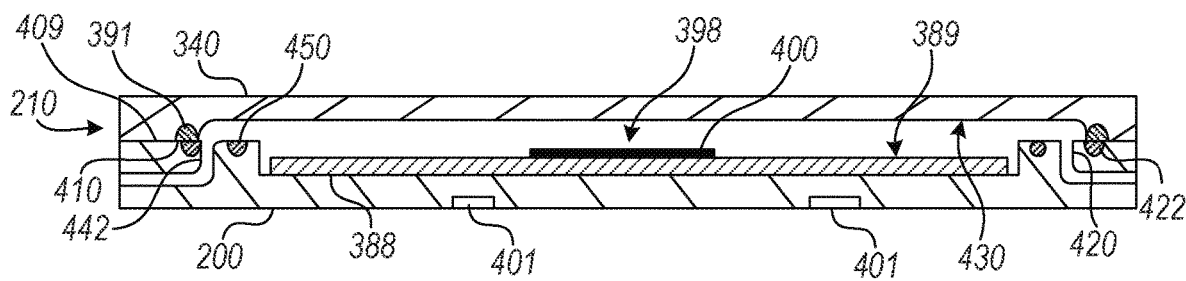
FIG. 8 is a detailed cross-sectional view of a portion the processing modules of FIG. 7.

FIG. 7 is a top view of the slide processing module 108 with the cover 340 in the closed position. FIG. 8 is a cross-sectional view of the flow cell 210 taken along line 8-8 of FIG. 9. Referring now to FIG. 7, the reagent cartridge 316 can include a housing 326 and an array of reagent capsules 330 (one identified) each containing reagent. The reagent cartridge 316 sequentially feeds the capsules 330 to a capsule receiver 322 such that the capsules 330 are successively delivered to and burst within a chamber of the capsule receiver 322. The capsules can be reagent-filled spherical or oblong vessels with a monolayer or multilayer shell comprising one or more materials suitable for contacting reagent therein.

The holding capacities of the capsules 330 can be substantially equal to each another to provide uniform dispensing volumes. In other embodiments, the capsules 330 can have varying volumes of reagents but may have similar shapes or sizes. For example, the shells can be partially filled or completely filled (if the shells have different wall thicknesses for providing the desired volume of reagent). In some embodiments, the capsules 330 hold a volume of reagent equal to or greater than at least about 0.5 mL, about 1 mL, about 2 mL, about 3 mL, about 4 mL, about 10 mL, about 20 mL, about 30 mL, about 40 mL, or about 50 mL. The contents, holding capacity, and shape/configuration of the capsules 330 can be selected based on the staining protocols to be performed. Table 1 below shows an example assay protocol and fluids, number of steps, volumes, and times (e.g., tissue exposure times).

| Fluid | Number of Steps | Vol (mL) | Time (min) |
| --- | --- | --- | --- |
| CC2 | 1 | 0.3 | 44 |
| AOS | 5 | 1.3 | 2.3 |
| ATF | 2 | 0.6 | 0.5 |
| RB | 11 | 3.3 | 2.8 |
| Enzyme Digestion | 1 | 0.3 | 20 |
| SSC | 1 | 0.3 | 0.3 |
| Denaturation | 1 | 0.3 | 24 |
| Hybridization | 1 | 0.3 | 364 |
| Stringency Wash | 1 | 0.3 | 36 |
| Silver 2nd Ab | 1 | 0.3 | 24 |
| Silver 3rd Ab | 1 | 0.3 | 36 |
| Silver A | 1 | 0.1 | 20 |
| Silver B | 1 | 0.1 | 0 |

-continued

| Fluid | Number of Steps | Vol (mL) | Time (min) |
|---|---|---|---|
| Silver C | 1 | 0.1 | 0 |
| Red Linker | 1 | 0.3 | 24 |
| Red Multimer | 1 | 0.3 | 24 |
| pH enhancer | 1 | 0.1 | 16 |
| napthol | 1 | 0.1 | 0 |
| Fast Red | 1 | 0.2 | 0 |
| Hematoxylin | 1 | 0.3 | 1 |
| Bluing | 1 | 0.3 | 0.2 |

Multiple capsules 330 can be used to obtain the desired total reagent volume of a processing step. For example, three capsules 330, each containing 0.1 mL of hematoxylin, can be burst to deliver 0.3 mL of hematoxylin to the flow cell 210. The reagent cartridge 316 can hold a set of reagent capsules 330 in a predetermined order for a staining protocol selected for a particular specimen. If a preloaded cartridge does not include the desired capsules, capsules can be removed, replaced, and/or reordered according to the protocol to be performed.

The reagent cartridge 316 can include at least one biasing member 331 that urges one or more of the capsules 330 toward the capsule receiver 322. The biasing member 331 can include one or more springs, such as helical springs, conical springs, or the like. In addition to and/or in lieu of biasing member(s), an instrument can include advancer (e.g., a push rod) that advances the capsules 330 toward the capsule receiver 322. In gravity-feed embodiments, the reagent cartridge 316 can be at a substantially vertical orientation to hold the capsules 330 in a vertical stack, thereby reducing the complexity of the cartridge and/or instrument, but such reagent cartridge can further include one or more biasing members to enhance feeding of capsules.

FIG. 8 shows the reaction chamber 398 can have a holding capacity equal to or less than about 25 µL, 50 µL, 100 µL, or 200 µL. In some embodiments, the flow cell 210 can hold about 25 µL to about 100 µL, about 50 µL to about 100 µL, or other desired volumes. The sealing ring 391 can sealingly contact the upper surface 389 or base surface 409 (illustrated) to form a seal 410. In some embodiments, the slide-receiving region 350 can include one or more heating elements 401 for generating thermal energy that is delivered uniformly or non-uniformly across the slide 388 via conduction to produce a substantially uniform or varying temperature profile along the specimen-bearing surface 389. The heating elements 401 can provide active heating/cooling to achieve a set point temperature of about 20° C. to about 140° C. (+/−1° C.). In some embodiments, the base 200 can provide active heating/cooling to produce set point temperature along the surface 389 of about 20° C. to about 40° C., about 40° C. to about 60° C., about 60° C. to about 80° C., about 80° C. to about 100° C., about 100° C. to about 120° C., or about 100° C. to about 140° C.

The heating elements 401 can be spaced apart to heat substantially the entire mounting area of the slide to produce a substantially uniform temperature profile along the slide's width, length, or both. This ensures that any portion of a specimen contacting the mounting surface 389 is maintained at a generally uniform temperature for consistent processing. Even if specimens move slightly along the mounting surface 389, the specimens can be consistently processed. In some embodiments, a substantially uniform temperature profile can be generated and may have less than selected temperature variation (e.g., a temperature variation of 1° C., 2° C., 5° C., or 10° C.) across the specimen-bearing portion (e.g., mounting area) of the specimen-bearing surface 389. Alternatively, the base 200 can generate non-uniform temperature profiles to localize heating at the mounting area.

The sealing ring 391 can comprise one or more compressible materials (e.g., rubber, elastomer, silicone, or the like) capable of forming the seal 410. The seal 410 can be a fluid-tight seal that prevents leaking of reagent and can be maintained when the pressure within the chamber 398 is at, above, or below a pressure of about 1 bar, 1.5 bar, 2 bar, 2.5 bar, 3 bar, 3.5 bar, or 4 bar, or other desired pressure suitable for pressurized staining. For example, a reagent within the chamber 398 can be at a pressure in a range of about 1 bar to about 4 bar, about 1.5 bar to about 3.5 bar, or the like. For a water boiling point of 140° C., the pressure can be about 3.6 bar (52 psi). The pressurized reagent can be heated to temperatures higher than the normal boiling temperature of reagent (e.g., when the reagent is at atmospheric pressure) to provide enhanced antigen/target retrieval. The chamber 398 can kept at a high enough pressure to inhibit or prevent boiling of the reagent when the reagent (e.g., a reagent comprising primarily water) is at a temperature equal to or higher than about 80° C. (e.g., taking into account higher altitude conditions), 90° C., 100° C., or 105° C. A clamping device or a user's hand can press the cover 340 against the slide 388 or base 200, or both, with sufficient force to maintain the fluid-tight seal 410 based on the pressure level.

Longitudinally extending sides of the sealing ring 391 can sealingly contact flat specimen-bearing surface 389 and end sections of the sealing ring 391 can contact the base 200. In some embodiments, the entire length of the sealing ring 391 can contact the specimen-bearing surface 389 to provide a continuous seal 410 surrounding the specimen 400 (shown in phantom line in FIG. 7). The cover 340 can include one or more inlet ports for delivering fluid into the reaction chamber 398 located along the upwardly facing specimen-bearing surface 389. The seal 410 can prevent surrounding air from entering the chamber 398 to limit or reduce degradation of the reagent. The configuration, mechanical properties (e.g., compressibility, resiliency, etc.), and composition of the sealing ring 391 can be selected based on, for example, desired sealing capabilities, reaction chamber dimensions, or the like.

With continued reference to FIG. 8, the flow cell 210 can include an inlet port 420 and an inlet sealing member 422. The inlet sealing member 422 can have a one-piece or multi-piece construction and can be a compressible split ring, a gasket, or another sealing element configured to sealingly engage the cover 340. To direct fluid toward the reaction chamber 298, the sealing member 422 can include one or more openings, slits, thinned regions, or other flow-through features.

The flow cell 210 can include an outlet port 442 at a downstream end of the reaction chamber 398. An outlet sealing member 450 can sealingly engage at least a portion of the cover 340 to inhibit or prevent reagent from escaping out of the flow cell 210 while waste reagent exits the reaction chamber 398. The sealing member 450 can include one or more openings, slits, narrowed or thinned regions, other features for allowing waste reagent or other fluids to flow through the outlet port 442.

In addition to and/or in lieu of the sealing members 422, 450, the flow cell 210 can include one or more connections, such as male/female connectors. The position and number of inlet and outlet ports can be selected based on the desired flow through the chamber 398. In some embodiments, a plurality of inlet ports 420 can be evenly or unevenly spaced along one side or end of the reaction chamber 398. Additionally or alternatively, a plurality of evenly or unevenly spaced outlet ports 442 can be positioned at an opposing side or end of the reaction chamber 398.

The cover 340 can have a surface 430 that can be generally parallel to the slide surface 402 to promote generally uniform laminar flow of reagent across the slide 388. In other embodiments, the reaction chamber 398 can be configured to promote turbulent flow. The configuration, dimensions, and features of the reaction chamber 398 can be selected based on desired flow rates, flow characteristics, volume of reagent, and/or sealing capability.

Figure 9:
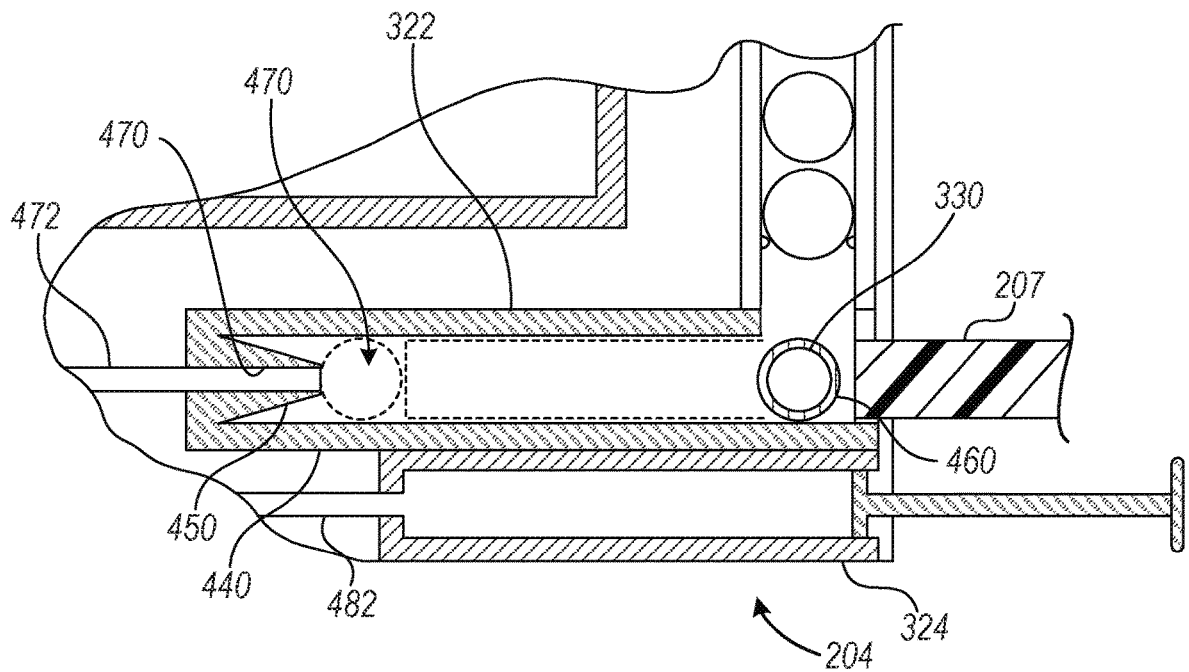
FIG. 9 is a detailed cross-sectional view of a dispensing unit of FIG. 7 in accordance with an embodiment of the disclosed technology.
Figure 10:
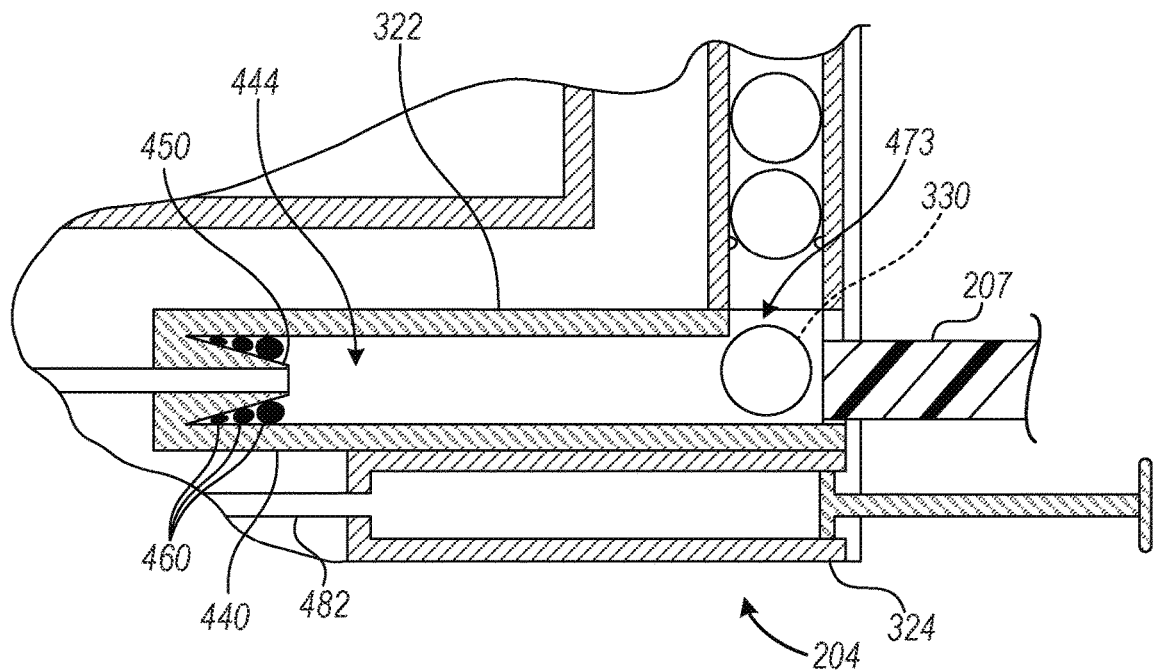
FIG. 10 is a detailed cross-sectional view of the dispensing unit after multiple capsules have released reagent.

FIG. 9 is a detailed cross-sectional view of the dispensing unit 204 in accordance with an embodiment of the disclosed technology. FIG. 10 is a detailed cross-sectional view of the dispensing unit 204. FIG. 9 shows the capsule receiver 322 including a barrel 440 defining the chamber 444 such that the capsule receiver 322 and actuator 207 can cooperate to cause reagent to be released from any reagent capsule positioned in the chamber 444. The dispenser 324 can be fluidically coupled, via passageway 482, to the flow cell 210, and if the dispenser 324 holds wash solution, it can hold a sufficient volume of wash solution to flush the reaction chamber. The dispenser 324 can hold other liquids.

Figure 11:
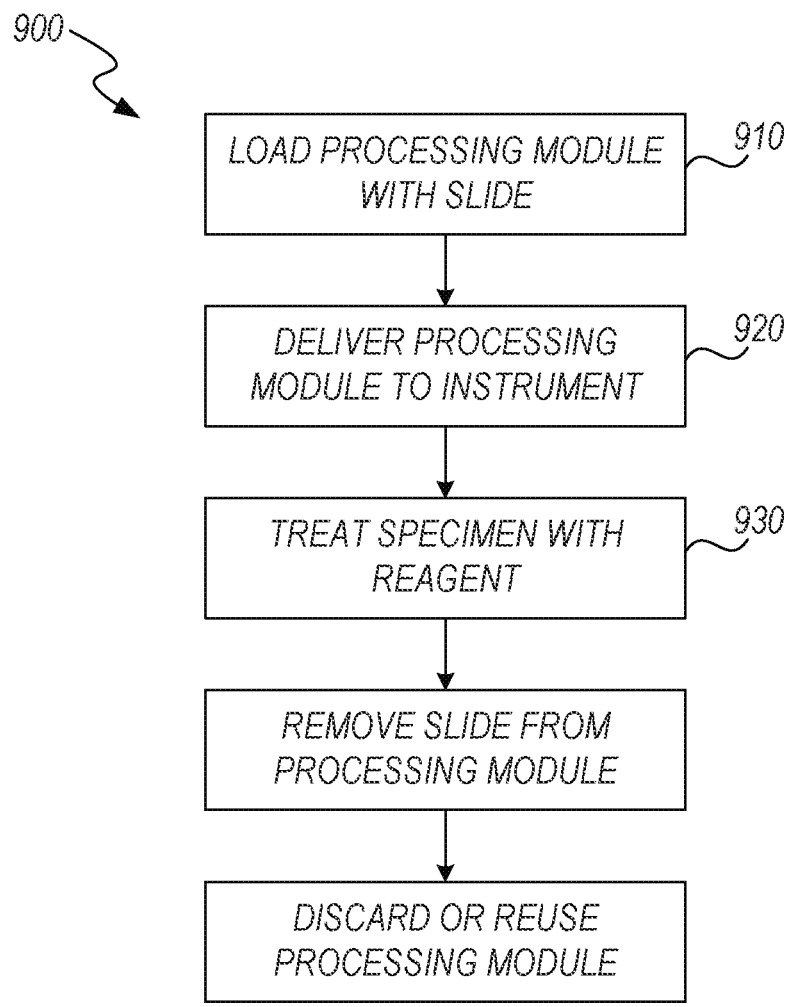
FIG. 11 is a flow chart illustrating a method for processing a specimen in accordance with an embodiment of the disclosed technology.

The actuator 207 can be a plunger disposed within the barrel 440 and can be movable to move the capsule 330 against a puncturing element 450. When the puncturing element 450 pierces a shell 460 of capsule 330, reagent in a capture chamber 462 can flow through a passageway 470 through the puncturing element 450. FIG. 11 shows three emptied and collapsed shells 460 along the puncturing element 450. In some embodiments, the dispensing unit 204 has an ejector mechanism for ejecting emptied shells 460. A fluid passageway 472 can fluidly couple the dispensing unit 204 to the flow cell 210.

Referring now to FIG. 10, the actuator 207 is located at a loading position for allowing the bottom-most capsule 330 to fall through an entrance 473 of the barrel 440 and into the chamber 444. In a dispense mode, the actuator 207 can move toward the reagent capsule(s) located within the chamber 444 such that the actuator 207 causes the capsule(s) to release reagent. In reload mode, the actuator 207 can be located at a standby position, as shown in FIG. 9, to allow another reagent capsule to be delivered into the chamber. The actuator 207 can include one or more sealing members that slidably contact the wall of the barrel 440 while the actuator 207 is moved between a loading position (FIG. 10) and a dispensing position (illustrated in phantom line in FIG. 9).

FIG. 11 is a flow chart illustrating a method 900 for processing a specimen in accordance with an embodiment of the disclosed technology. In general, a stainer unit can be loaded with a specimen-bearing slide. The stainer unit can be delivered to an automated instrument, and the specimen is treated using one or more reagents carried by the stainer unit. After processing the specimen, the specimen-bearing slide can be removed from the stainer unit. Although method 900 is primarily discussed in connection with capsule-based processing module of FIGS. 5-11, the method can be performed using other stainer units. Details of the method 900 are discussed in detail below.

At block 910, the processing module 108 can be loaded with a microscope slide placed at the set down area 350. Specimens on the slide can have tissue fixed prior to placement in the processing module 108. The cover 340 can be moved from the open position (FIG. 6) to a closed position (FIG. 5).

At block 920, the processing module 108 can be delivered to the instrument. A user can input information into the instrument, and a controller can determine a program for operating the components based, at least in part, on the inputted information. The inputted information can include, without limitation, one or more staining protocols, tissue sample information, processing times, imaging protocols, or the like. The user can also select a stored program to perform a desired protocol. If the processing module and/or slide include a label (e.g., RFID tags, transponders, or the like) that contains information that can be acquired by, e.g., readers, scanners, or other devices, and the acquired information can be sent to the controller, which in turn determine an appropriate program. Different programs can be used to perform tissue conditioning, staining, target retrieval, IHC, ISH, etc. The programs can be calculated, determined, or selected based on information about the slide/specimen and/or the available reagents. For example, a program can be determined based on the available reagents carried by the processing module, composition of the specimen, tissue type, or the like. If the processing module cannot be used to process the specimen, the instrument can notify a user that another processing module should be used.

At block 930, the instrument can treat the specimen using reagents from the processing module. The holding capacity of the reagent capsules can be in a range of about 20 μl to about 100 μl, about 100 μl to about 200 μl, about 1 microliters to about 5 microliters, 5 microliters to about 50 microliters, about 25 microliters to about 75 microliters, but more typically, the capsules will have a holding capacity in the equal to or less than about 25 μL, about 50 μL, about 100 μL, about 150 μL, or about 200 μL. In some embodiments, the capsules can hold about 25 μL to about 100 μL, about 50 μL to about 100 μL, about 75 μL to about 120 μL or other desired volumes. If the processing module is configured for receiving reagents from pipettes, the pipettes can have similar holding capacities.

The dispenser apparatus 160 (FIG. 2) can operate to cause reagent to be released sequentially from the capsules. The released reagent can flow into the flow cell 210 to fill the reaction chamber 398 (FIG. 8). The closed flow cell can prevent evaporative losses to avoid using excessive amounts of reagent. The reagent can be replenished with fresh reagent any number of times to achieve desired staining. For example, the controller 130 (FIG. 1) can instruct the dispenser apparatus 160 to provide supplemental reagent at a desired rate (e.g., a fixed rate or a variable rate) based on the degradation or oxidation rates of the liquid.

In some protocols, a series of liquids can include, for example, a deparaffinizing liquid, a conditioning liquid, a staining reagent, a stain-differentiating reagent, a stain-setting reagent, a counterstaining reagent, a washing liquid, and a coverslipping liquid. During deparaffinizing, a paraffin composition in which the specimen is embedded can be at least partially removed to prepare the specimen for further processing. The system 201 of FIG. 4 can process slides in parallel. In at least some cases, deparaffinizing includes iterations (e.g., 4, 5, 6, 7, 8, or another suitable number of iterations) of dispensing a deparaffinizing liquid onto slides respectively carrying the specimens, allowing the dispensed deparaffinizing liquid to remain in contact with a paraffin composition in which the specimens are embedded for a suitable period of time so as to solubilize a portion of the paraffin composition, and then removing the dispensed deparaffinizing liquid along with a solubilized portion of the paraffin composition.

After deparaffinizing and conditioning, staining, target retrieval, IHC, ISH, or other processes can be performed on the conditioned specimen. Optional washing can include iterations (e.g., 2, 3, or another suitable number of iterations) of dispensing a washing liquid onto a slide, allowing the dispensed washing liquid to remain in contact with the specimen for a suitable period of time so as to wholly or incrementally wash the specimens (e.g., while the washing liquid is in the form of a puddle having a shape maintained at least partially by surface tension), and then removing the dispensed washing liquid. The washing liquid can flush out the deparaffinizing and solutions. The time during which the dispensed washing liquid is in contact with the specimen can be, for example, a time within a range from 5 seconds to 45 seconds, from 20 seconds to 1 minute, or the like. When used in temperature-controlled flow cells configured in accordance with at least some embodiments of the present technology, incubation temperatures can be used alone or in conjunction with incubation time to control processing.

The seal 410 (FIGS. 7 and 8) can be a fluid-tight seal that prevents leaking of reagent and can be maintained when the pressure within the chamber 398 (FIG. 8) is at or above a threshold suitable for pressurized staining. The pressurized reagent can be heated to temperatures higher than the normal boiling temperature of reagent (e.g., when the reagent is at atmospheric pressure) to provide enhanced antigen retrieval. The chamber 398 can kept at a high enough pressure to inhibit or prevent boiling of the reagent when the reagent (e.g., a reagent comprising primarily water) is at a temperature equal to or higher than about 100° C. or 105° C. For example, the chamber 380 can be sealed by closing the valves 353, 355, and the seal 370, as well as any other seals of the flow cell, can be selected to increase the boiling points of reagents or buffers at least about 5%, 10%, 15%, 20%, or 25%. Enhanced staining can be achieved in very short times with such an arrangement. A clamping device or a user's hand can press the cover 340 against the slide 388 with sufficient force to maintain the fluid-tight seal 410. In some embodiments, the seal 410 prevents surrounding air from entering the chamber 398 to limit or reduce degradation of the reagent. The configuration, mechanical properties (e.g., compressibility), and composition of the sealing gasket 392 can be selected based on, for example, desired sealing capabilities, reaction chamber dimensions, or the like.

The specimen can be dehydrated and a coverslip can be applied. Coverslipping liquids can be applied directly to the microscope slide after opening the cover. A coverslipping liquid selected or formulated in accordance with a particular embodiment of the present technology includes about 100% d-limonene with a suitable preservative, such as 500 parts per million butylated hydroxytoluene. After applying the coverslipping liquid, the system can then apply coverslips.

At block 940, the processing module 108 can be removed from staining instrument and opened to remove the processed slide. The specimen can be microscopically analyzed. The waste materials (e.g., reacted reagent) can be contained in a waste container of the processing module throughout slide removal and disposal. In some procedures, coverslipping is performed after removing the slide from the processing module.

At block 950, the processing module itself or its disposable components can be discarded. As used herein, the term "disposable" when applied to a system or component (or combination of components), such as a stainer unit or processing module, is a broad term and means, without limitation, that the component in question is used a finite number of times and then discarded. Some disposable components are used only once and then discarded. Other disposable components are used more than once and then discarded. For example, a disposable waste container can be used to collect waste generated by a single assay and is then discarded whereas a base of a module can be used multiple times.

Although various operations are presented in a sequence(s), it should be understood that the various operations discussed in connection with method 900 may be performed in orders other than those that are illustrated, or may be performed concurrently. Examples of such alternate orderings includes interrupted, reordered, supplemental, simultaneous, reverse, or other variant orderings, unless context dictates otherwise. For example, the specimens can be pretreated, either manually or robotically, with conditioners prior to delivery to the instrument at block 920. In some embodiments, the flow cell can be opened to access the slide for coverslipping. In one embodiment, a coverslipper as substantially as described in U.S. Patent Application Publication No. 2004/0092024A1 or U.S. Pat. No. 7,468,161, which are incorporated by reference herein in their entireties, can be integrated the systems disclosed herein. After opening a cover, the automated coverslipper can apply the coverslip to the uncovered slide. The coverslippers described in U.S. Patent Application Publication No. 2004/0092024A1 or U.S. Pat. No. 7,468,161 and their operation can be implemented to enhance coverslip handling by, for example, detecting broken coverslips, facilitating single coverslip pickup, increasing coverslipper placement precision, and/or increasing system throughput.

The various embodiments described above can be combined to provide further embodiments. The embodiments, features, systems, devices, materials, methods, and techniques described herein may, in some embodiments, be similar to any one or more of the embodiments, features, systems, devices, reagents, processing steps, materials, methods, and techniques described in U.S. patent application Ser. No. 11/187,183; U.S. patent application Ser. No. 13/509,785; U.S. patent application Ser. No. 13/509,785; U.S. patent application Ser. No. 13/157,231; U.S. Pat. Nos. 7,468,161; 9,618,430; and 8,790,596; PCT Application No. PCT/EP2019/068814; U.S. Provisional Application No. 62/698,820; and International App. No. PCT/US2010/056752, all of which are incorporated by reference in their entireties. In addition, the embodiments, features, systems, devices, materials, methods, and techniques described herein may, in certain embodiments, be applied to or used in connection with any one or more of the embodiments, features, systems, devices, materials, methods, and techniques disclosed in the above-mentioned U.S. patent application Ser. No. 11/187,183; U.S. patent application Ser. No. 13/509,785; U.S. patent application Ser. No. 13/509,785; U.S. patent application Ser. No. 13/157,231; U.S. Pat. Nos. 7,468,161; 9,618,430; and 8,790,596; and International App. No. PCT/US2010/056752. Aspects of the disclosed embodiments can be modified, if necessary, to employ concepts of the various patents, applications, and publications to provide yet further embodiments. All applications listed above are incorporated herein by reference in their entireties.

From the foregoing, it will be appreciated that specific embodiments of the invention have been described herein for purposes of illustration, but well-known structures and functions have not been shown or described in detail to avoid unnecessarily obscuring the description of at least some embodiments of the invention. The systems, apparatuses, and components described herein can perform a wide range of processes for preparing biological specimens for analysis. The scheduling and methods disclosed herein can be used with different types of specimen processing systems with apparatuses configured to deliver liquid into reaction chamber. In other embodiments, one, multiple, or all of the steps can be performed manually. In some embodiments, a combination of manual steps and automated steps can be performed. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list. The singular forms "a," "an," and "the" include plural referents unless the context clearly indicates otherwise. Thus, for example, reference to "a specimen" refers to one or more specimens, such as two or more specimens, three or more specimens, or four or more specimens.

The various embodiments described above can be combined to provide further embodiments. The embodiments, features, systems, devices, materials, methods, and techniques described herein may, in certain embodiments, be applied to or used in connection with any one or more of the embodiments, features, systems, devices, materials, methods, and techniques disclosed in the above-mentioned patents and applications. Aspects of the disclosed embodiments can be modified, if necessary, to employ concepts of the various above-mentioned patents, applications, and publications to provide yet further embodiments.

I claim:

1. An automated slide staining system, comprising:
    a high-temperature slide processing module including
        a reaction cell configured to at least partially define a reaction chamber along a specimen-bearing surface of a microscope slide that is carried by the high-temperature slide processing module,
        a capsule receiver connected to the reaction cell, the capsule receiver including
            a barrel including a chamber,
            a stationary puncturing element, and
            an actuator, and
        a fluid circuit fluidically coupling the capsule receiver to the reaction chamber to allow reagent in the chamber to be delivered to the reaction chamber, the reaction cell is sealed to inhibit boiling of one or more of the reagents in the reaction chamber; and
    a reagent cartridge containing a plurality of reagent capsules each containing at least one reagent, wherein the reagent cartridge is configured to couple to the high-temperature slide processing module such that the reagent capsules individually move out of the reagent cartridge and into the chamber,
    wherein the actuator is movable along the chamber to cause a respective one of the reagent capsules in the chamber to be moved toward the stationary puncturing element such that the stationary puncturing element punctures the respective one of the reagent capsules, thereby releasing reagent from the respective one of the reagent capsules for delivery to the reaction cell.

2. The automated slide staining system of claim 1, wherein the fluid circuit includes one or more valves in fluid communication with the reaction chamber and operable to seal the reaction chamber.

3. The automated slide staining system of claim 1, wherein the fluid circuit allows the regents to be sequentially delivered to the reaction chamber and inhibits fluid flow out of the reaction chamber to increase a boiling point of reagent within the reaction chamber.

4. The automated slide staining system of claim 1, wherein the reagent dispenser fluidly coupled to the reaction cell by the fluid circuit such that reagent released by reagent dispenser flows into the reaction chamber.

5. The automated slide staining system of claim 1, wherein when the reaction cell is selectively sealed, the reaction chamber is pressurizable to raise a boiling point of one or more of the reagents in the reaction chamber for high temperature target retrieval.

6. The automated slide staining system of claim 1, wherein the fluid circuit includes
    an inlet valve in fluid communication with an inlet port of the reaction cell, and
    an outlet valve in fluid communication with an outlet port of the reaction cell and a waste container.

7. The automated slide staining system of claim 1, further comprising:
    a staining instrument operable to cause the respective one of the reagent capsules to release reagent therein.

8. The automated slide staining system of claim 1, wherein the reaction cell has a compressible sealing member that sealingly contacts a specimen-bearing surface to form a fluid-tight seal.

9. The automated slide staining system of claim 1, wherein when the reaction chamber is sealed, the boiling point of the reagent within the reaction chamber is raised at least about 10% higher than the boiling point of the reagent at atmospheric pressure.

10. The automated slide staining system of claim 1, wherein at least one of the reagents is a liquid reagent comprising mostly water by weight, wherein the reaction cell has an open configuration for receiving the microscope slide and a closed configuration for processing a specimen, and wherein the reaction cell in the closed configuration is sealed to prevent boiling of the liquid reagent in the reaction chamber when the liquid reagent is heated to a temperature equal to 110° C.

11. A slide processing module, comprising:
    a base platform;
    a flow cell supported by the base platform and configured to sealingly contact a specimen-bearing surface of a microscope slide to define a reaction chamber configured to maintain an elevated pressure to inhibit boiling of one or more of reagents in the reaction chamber;
    a reagent cartridge containing a set of reagent capsules for staining a specimen carried on the specimen-bearing surface of the microscope slide; and
    a capsule receiver carried by the base platform and fluidly coupled to the flow cell, wherein the capsule receiver includes an actuator, wherein the reagent cartridge is configured to dispense the reagent capsules individually such that the individually dispensed reagent capsule moves into a chamber of the capsule receiver, wherein the actuator is movable along the chamber to cause a respective one of the reagent capsules in the chamber to be moved toward a stationary puncturing element of the capsule receiver such that the stationary puncturing element punctures the respective one of the reagent capsules, thereby causing the respective one of the reagent capsules in the chamber to release reagent that flows into the reaction chamber to stain the specimen while the reagent cartridge is coupled to the capsule receiver and configured to individually dispense additional ones of the reagent capsules in the set into the capsule receiver.

12. The slide processing module of claim 11, further comprising a fluid circuit fluidically coupled to the reaction chamber, wherein the fluid circuit includes one or more valves in fluid communication with the reaction chamber and operable to seal the reaction chamber.

13. The slide processing module of claim 12, wherein the fluid circuit is configured to allow a sequence of regents to be sequentially delivered to the reaction chamber and to inhibit fluid flow out of the reaction chamber to increase a boiling point of reagent within the reaction chamber.

14. The slide processing module of claim 11, further including a reagent dispenser fluidly coupled to the reaction cell by a fluid circuit of the base platform such that reagent driven by reagent dispenser flows from the capsule receiver into the reaction chamber.

15. The slide processing module of claim 11, wherein when the reaction chamber is sealed, the boiling point of the reagent within the reaction chamber is raised at least about 10% higher than the boiling point of the reagent at atmospheric pressure.

\* \* \* \* \*